(12) United States Patent
Diekhans

(10) Patent No.: US 7,846,013 B1
(45) Date of Patent: Dec. 7, 2010

(54) COMBINE WITH A DEVICE FOR AUTOMATIC CLEANING REGULATION

(75) Inventor: Norbert Diekhans, Gütersloh (DE)

(73) Assignee: Claas Selbstfahrende Erntemaschinen GmbH (DE)

( * ) Notice: Subject to any disclaimer, the term of this patent is extended or adjusted under 35 U.S.C. 154(b) by 0 days.

(21) Appl. No.: 09/640,126

(22) Filed: Aug. 16, 2000

Related U.S. Application Data

(63) Continuation of application No. PCT/EP99/00963, filed on Feb. 13, 1999.

(51) Int. Cl.
A01D 75/18 (2006.01)

(52) U.S. Cl. .............................................. 460/1; 460/6

(58) Field of Classification Search ...................... 460/1, 460/5, 7, 6, 101, 100; 56/10.2 R, 10.2 A, 56/10.2 B, 10.2 C, 10.2 G
See application file for complete search history.

(56) References Cited

U.S. PATENT DOCUMENTS

| | | | |
|---|---|---|---|
| 4,466,231 A | | 8/1984 | Rowland-Hill et al. |
| 4,487,002 A | * | 12/1984 | Kruse et al. ............... 56/10.2 G |
| 4,527,241 A | | 7/1985 | Sheehan et al. |
| 5,775,072 A | | 7/1998 | Herlitzius et al. |
| 5,991,025 A | * | 11/1999 | Wright et al. ............... 356/328 |
| 5,995,895 A | * | 11/1999 | Watt et al. ..................... 701/50 |
| 6,117,006 A | * | 9/2000 | Hofer ........................... 460/101 |
| 6,585,584 B2 | * | 7/2003 | Buermann ................... 460/101 |

FOREIGN PATENT DOCUMENTS

| | | |
|---|---|---|
| DE | 1 265 476 | 4/1968 |
| DE | 27 53 505 | 6/1979 |
| DE | 38 10 723 A1 | 11/1988 |
| DE | 288 085 | 3/1991 |
| DE | 43 25 310 A1 | 2/1995 |
| DE | 44 25 453 C1 | 9/1995 |
| EP | 0 728 409 A1 | 8/1996 |
| GB | 2 014 025 | 8/1979 |
| GB | 2 098 446 A | 11/1982 |

OTHER PUBLICATIONS

German Magazine article "Gesteuerte adaptive Regelung einer Mähdrescherreinigungsanlage" published in "Grundlagen der Landtechnick" Magazine, Band 36 (1986) Nr. 3, pp. 73-78.
Article by H.D. Kutzbach, Stuttgart from "1995 Yearbook Agricultural Engineering" entitled "Grain harvesting", pp. 145-153.

* cited by examiner

*Primary Examiner*—Alicia M Torres
(74) *Attorney, Agent, or Firm*—Robert C. Haldiman; Husch Blackwell Sanders LLP

(57) ABSTRACT

The invention relates to a combine with a cleaning device (1), having a screening device (2) with at least one screen (2A, 2B) in which the harvested products conveyed to the thresher and to the separation device are cleaned and at least one adjustable blower (3) for exposing the screening device (3) to an air flow. The width of the openings of the sifting device (2) and the revolutions of the blower (3) can be mechanically regulated by at least one regulation organ. According to the invention, at least one sensor (4) is provided whose measuring signal (S/4) directly or indirectly indicates a quantity of harvested products loaded on the combine, especially on the cleaning device. Optimal regulation of the cleaning device, especially the width of the openings of the screen, is performed by an adjusting organ (20A, 20B) depending on the signal (S/4) of the sensor (4).

16 Claims, 2 Drawing Sheets

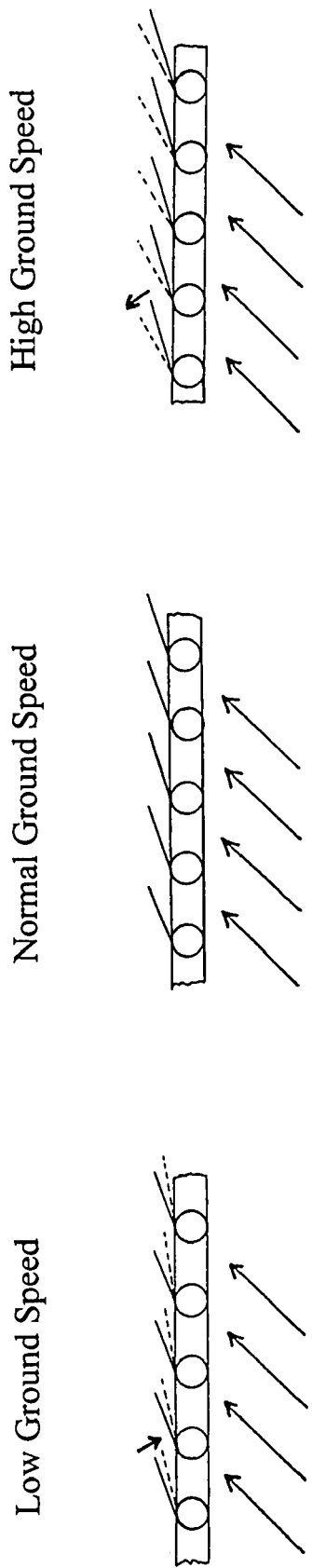

COMBINE WITH A DEVICE FOR AUTOMATIC CLEANING REGULATION

This application is a continuation of PCT Application No. PCT/EP99/00963 filed 13 Feb. 1999 and which named the United States as a designated country.

The invention relates to a combine harvester incorporating a cleaning mechanism which comprises a sieve device including at least one sieve for cleaning the crop produced by the threshing and separating mechanisms and at least one adjustable fan for forcing a blast of air through the sieve device, whereby the opening widths of the sieve device and/or the speed of the fan are adjustable by means of at least one adjusting member.

The threshed crop produced by the threshing and separating mechanisms is A mixed with chaff and short lengths of straw. The cleaning mechanism serves for separating the crop from these additional constituents. The blast of air emerging through the sieve openings separates the crop-chaff-short-straw mixture that has been fed onto the sieve device and causes the specific lighter chaff and short straw components to be separated out whilst allowing the heavier grains of the crop to fall through the sieve openings onto the catching and feed pans from where they are supplied to a grain auger which feeds the cleansed crop via an elevating conveyor into the grain tank. An optimum setting for the cleaning mechanism (i.e. fan speed and/or sieve opening width) has been attained when the crop can be harvested without losses and in a cleansed form i.e. separated from the chaff and short lengths of straw.

The setting of the cleaning mechanism is effected prior to harvesting in dependence on the type of crop and in accord with certain standard values or by using values based upon experience. To this end, the fan speed and the opening widths of the sieve device are generally set manually from the driver's cab.

Now in order to find the optimum setting, care must be taken to ensure that the crop-chaff-short-straw mixture located above the sieve is subjected to an adequate quantity of air and that the speed and direction of the blast be correct. The composition of this mixture is dependent on a plurality of parameters specific to the crop such as, for example, the moisture contents of the crop and the straw, the type of crop and also the settings of the threshing and separating mechanisms.

Another important factor affecting the quality of the cleansing process is the quantity of crop-chaff-short-straw mixture with which the cleaning mechanism has to deal. This, in turn, depends on the instantaneous throughput of the crop.

A monitoring and regulating arrangement is proposed in DE 27 53 505 A1 wherein the air pressure in the cleaning mechanism, i.e. the air pressure in the region between the sieves and the fan, is detected and indicated by means of appropriate sensors. Also, in one embodiment of the invention, the cleaning mechanism is automatically set in dependence on this measured air pressure. It was assumed therein that the flow resistance of the air in the cleaning mechanism, and hence too, the air pressure therein, was proportional to the amount of material passing through the cleaning mechanism.

In general, the air pressure in the cleaning mechanism is dependent on the crop itself and also upon the setting of this mechanism. The air pressure is affected by the flow resistance in the cleaning mechanism and by the setting of the fan. Thus, it is affected by the composition and the quantity of crop in the cleaning mechanism, and also by the setting i.e. the opening width of the sieve in the cleaning mechanism. Consequently, the proposed method of determining the throughput of material in the cleaning mechanism only provides a reproducible indication in regard thereto when all the other relevant parameters remain unaltered and when it is only the throughput that varies. Thus, for example, if the throughput in the cleaning mechanism increases, this will be indicated by an increase in the air pressure. It is then necessary to alter the setting of the cleaning mechanism to adapt to this increased throughput for optimum functioning of the cleaning mechanism. However, this alteration simultaneously alters the relationship between the air pressure and the throughput of material. Consequently, it is not possible to regulate the setting of the cleaning mechanism on the basis of the measured air pressure due to the fact that the setting of the cleaning mechanism has an effect upon the air pressure. If, for example, the opening width of the sieve is automatically altered on the basis of a detected change in air pressure, then a new flow resistance value will be created as a result of the alteration in the flow resistance of the sieve and the alteration in the flow resistance of the material. Consequently, the air pressure as determined after the change in the sieve opening can no longer be unambiguously related to the then existing throughput of the material. Hence, the use of the air pressure prevailing in the cleaning mechanism as a means for automatically setting the cleaning mechanism does not represent a practicable solution to the problem.

In order to compensate for alterations in the loading imposed on the cleaning process, it was proposed in DE 44 25 453 C1 that the rotational speed of the fan be regulated in dependence on the speed of the air blast as measured above the sieve device, or, upon the pressure as measured thereabove. A disadvantage of this manner of automatically adjusting the setting of the cleaning mechanism is that the pressure or the speed of this blast of air does not provide a direct measure as to the quality of the cleansing action. Furthermore, a change of rotational speed can only be effected in a relatively slow manner so that it is not possible to react to every variation in the measured values. In addition, the pressure or the speed of the air blast can only be measured at particular points so that these measurements will not always be representative for the whole of the cleaning mechanism.

Consequently, an object of the invention is to provide a combine harvester wherein the optimum setting for the cleaning mechanism is derivable from a value that is truly representative of the loading on the cleaning mechanism.

This object is achieved by the special features defined in Claim 1. Further developments of the invention are specified in the appendant claims.

In accordance with the invention, there is provided a sensor whose measuring signal provides a direct or indirect measure of the loading to which the combine harvester, and in particular, the cleaning mechanism, is subjected whereby the setting of the cleaning mechanism is effected in dependence on this signal by means of a known adjusting member. Thus, for the first time, it is then possible to optimally set the cleaning mechanism in dependence on the throughput of the crop.

In a first embodiment, the setting of the cleaning mechanism is implemented by altering the opening width of the sieve. This enables the quality of the cleansing process and the losses entailed therein to be adjusted over a very wide range thereby resulting in an optimum cleansing action. Preferably, provision is made for setting both the upper and the lower sieves in accord with this inventive process, whereby, as a limiting case of the invention, it is of course possible for the opening width of just one of the sieves to be adjusted in dependence on the signal from the sensor. Furthermore, in one advantageous embodiment of the invention, provision is made for separately setting the sub-sieves of at least one sieve composed of at least two such sub-sieves.

In another embodiment, provision is made for varying the rotational speed of the fan in dependence on a measuring signal which provides a direct or indirect measure of the loading on the combine harvester.

Moreover, optimum setting of the cleaning mechanism can be effected by means of a combination of a sieve setting and a rotational speed of the fan.

The sensor may, for example, be in the form of a device for measuring the amount of straw in the feeder housing of the combine harvester. This device determines the amount of straw on the basis of the deflection of a feed chain or an intake auger or drum. Another form of sensor that could be mentioned would be a device for measuring the ground speed of the combine harvester. This is because the amount of crop picked-up by the combine harvester rises with increasing ground speed when the crop is uniformly distributed. Moreover, modern combine harvesters are equipped with a system for detecting the amount of crop being harvested. A setting for the cleaning mechanism could also be derived from the value of this quantity.

The setting of the cleaning mechanism in dependence on the sensor signal may be effected with the aid of an evaluating unit which uses an internally programmed function for calculating a control signal for the adjusting member.

As an alternative thereto, provision may be made for the evaluating unit to comprise a memory in which previously determined dependencies between the desired setting values and the sensor signal are stored in the form of a table or a characteristic curve or a family of characteristic curves, whereby the relevant control signal can be determined with the aid of the table or the characteristic curve.

In another embodiment of the invention, provision is made for the setting of the cleaning mechanism 1 to be effected after a time delay. Generally, a sensor is located at a distance from the cleaning mechanism. This is done as a matter of necessity so that the cleansing setting derived from the sensor signal will then be effected only when the cleaning mechanism is actually subjected to the detected loading. This time delay is calculated on the basis of the path between the location of the sensor and the cleaning mechanism in a specific machine, the throughput speed of the crop through the harvesting machine and the known time required for the adjusting member to operate.

The invention will be explained in detail hereinafter with the help of the attached drawing.

FIG. 2 is the differing sieve settings for various ground speeds.

Figure 1:
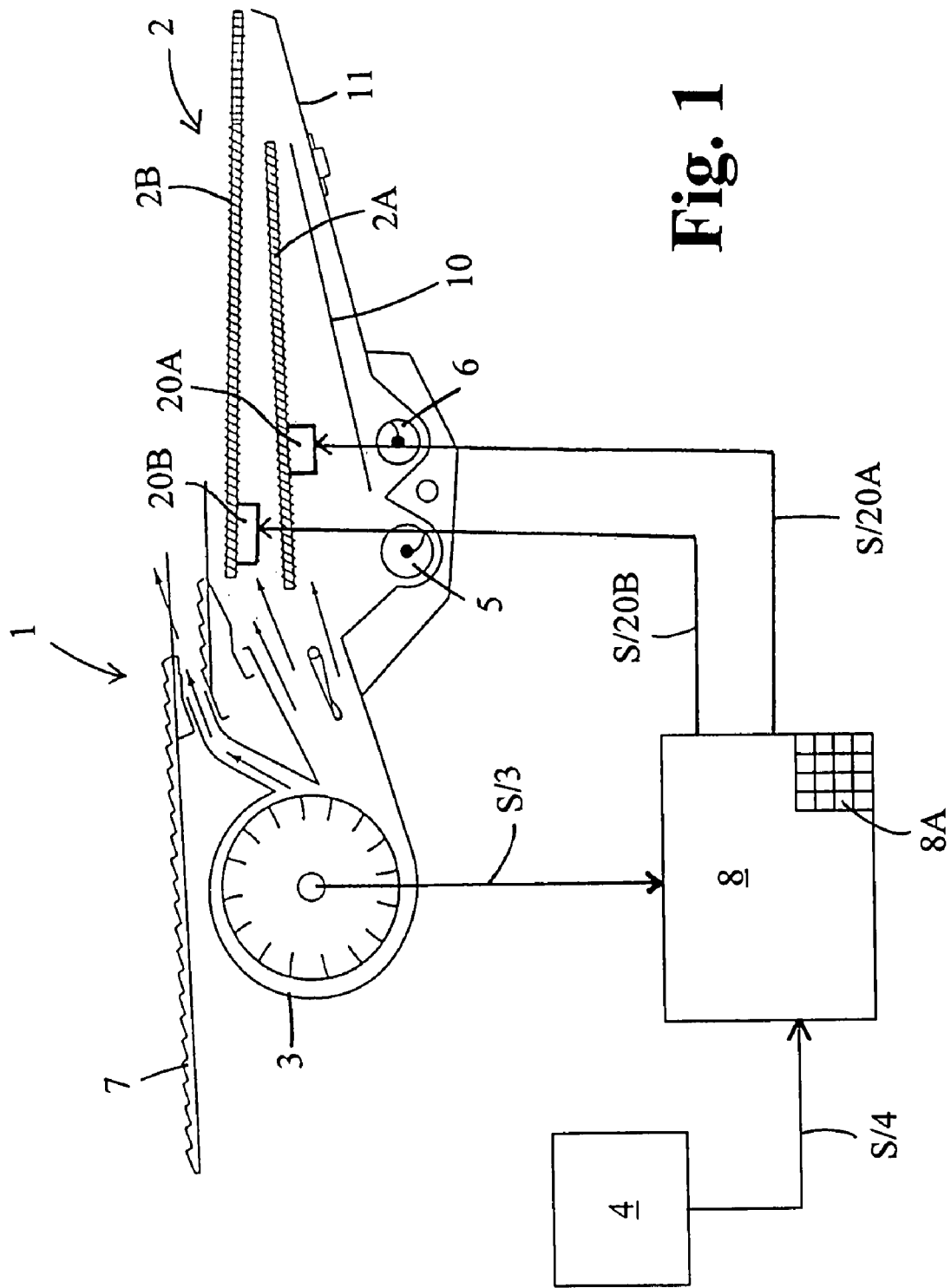
FIG. 1 is a side view of the cleaning mechanism.

The crop-chaff-short-straw mixture coming from the not-illustrated threshing and separating mechanisms is initially transported over the step-like upper surface of the grain pan 7 by means of a horizontal shaking motion thereof to the sieve device 2 where it is pre-sorted. The heavier crop falls downwardly therethrough whereas the lighter chaff and short-straw components are separated upwardly.

A cleaning mechanism 1 illustrated in FIG. 1 consists of a sieve device 2 comprising an upper sieve 2B and a lower sieve 2A, and a fan 3 which supplies a blast of air to the lower and upper sieves 2A, 2B from below via suitable wind boards. The task of the lower sieve 2A is to separate out the contaminants which fell through the openings in the upper sieve 2B together with the crop. The crop falls through the lower sieve openings onto a catching and guide pan 10 which passes it to a grain feed auger 5 from where it is conveyed to the grain tank by means of an elevating conveyor. Items which are larger than the crop being harvested (e.g. unthreshed ears) cannot fall through the sieves 2A, 2B. They are swept along over the sieves by the air blast and the shaking motion of the sieves and are eventually returned to the thresher via a return pan 11 and the returns auger 6.

The sieves 2A, 2B are preferably in the form of louvered sieves consisting of toothed lamella of variable inclination which are disposed one behind the other. In order to set the width of the sieve opening, each sieve 2A, 2B comprises a known adjusting member 20A, 20B. This may, for example, be an electro-hydraulic adjusting member or an electro-mechanically driven screw which adjusts the inclination of the lamella through the medium of a lever.

It is advantageous if the magnitude of the openings in the upper sieve 2B can be varied over a range of 8 to 24 mm, whilst that of the openings in the lower sieve 2A can be varied over a range of 2 to 20 mm. A sensor 4 is located a distance from the cleaning mechanism 1. The sensor 4 is indicated schematically and has a measuring signal S/4 which is a direct or indirect measure for the load exerted on the combine harvester by the crop and is thus a signal for indicating the loading on the cleaning mechanism. Hence the signal S/4 is independent of the setting of the cleaning mechanism 1. As already mentioned, various types of sensor could be considered. Here, another type of sensor will be mentioned viz. one which measures the moisture content of the straw. This comes into consideration because the brittleness of dry stalks is greater and leads to an increased quantity of short-straws which in turn imposes a greater load on the cleaning mechanism 1. In addition, a sensor which measures the spacing of the concave from the threshing cylinder could, in accordance with the invention, be made use of since this spacing also has an effect upon the loading on the cleaning mechanism 1.

In practicing the technical teaching of the invention, the skilled person is not restricted to a particular type of sensor, but rather, the decisive factor is that a sensor 4 be provided whose measuring signal S/4 represents a measure for the load on the combine harvester, and in particular, for the load exerted by the crop on the cleaning mechanism, and that this measuring signal be used for setting the cleaning mechanism. In dependence on the type of sensor being used, the relationship between the load exerted by the crop and the measuring signal is determined, and the wanted cleansing setting to be derived therefrom is imaged with the aid of a program or is stored in the form of a table, a characteristic curve or a family of characteristic curves. It is also quite conceivable for the cleansing setting to be derivable from a plurality of detectable influential factors or combinations thereof.

For example, an evaluating unit 8 may be provided on the combine harvester wherein a control signal S/20A, S/20B for setting the wanted sieve opening is calculated by means of a programmed function $\Phi$ in dependence on the measuring signal S/4: $\Phi(S/4) \Rightarrow S/20A$ or $S/20B$.

As an alternative to calculating the control signals for the adjusting members, provision is made for the evaluating unit 8 to comprise a store in which a plurality of previously determined dependencies between the wanted setting values, here for example, the sieve opening widths or the control signals S/20A, S/20B required therefor, and the measuring signal S/4 are stored in the form of a table or a characteristic curve or a family of characteristic curves.

As illustrated in FIG. 1, it is preferable for the rotational speed of the fan to be supplied to the evaluating unit in the form of a signal S/3. When using a family of characteristic curves, provision is then made, inter alia, for selecting a characteristic curve in dependence on the rotational speed of the fan, or, when using a programmed function, certain parameters are altered in dependence on the rotational speed of the fan.

Moreover, means (e.g. keyboards, touch screens, or the like) are preferably provided for allowing the programmed function or the stored dependencies to be altered by the driver of the combine harvester.

The signal lines from the sensor 4 to the evaluating unit 8, the evaluating unit itself, and also the signal lines for the control signals to the adjusting members are preferably integral components of a network system installed in the combine harvester.

The setting of the cleaning mechanism in dependence on the sensor signal S/4 can be effected fully automatically. The sieve opening or the fan speed are altered by an associated regulating circuit until the predetermined preferred values are obtained. This regulator may be installed directly in the adjusting arrangement or may form a part of the evaluating unit 8. The individual control values are supplied to the respective regulators by known means and they may also be made available for other evaluation process or as test values for further setting actions.

It is also possible to set the cleansing setting manually in that the driver of the combine harvester is made aware of the settings proposed in accordance with the invention by means of a control panel monitor so that he can implement them by pressing a button for example.

Furthermore, a warning device, an optical or an acoustic device for example, is provided for warning the driver should the setting values e.g. the sieve opening width and/or the change in the sieve opening and/or the rotational speed of the fan have exceeded predetermined limiting values.

FIG. 2 depicts how the widths of a sieve (e.g. the upper sieve) are set in dependence on the ground speed signal. In a field where the crop is uniform, an average ground speed indicates an average throughput of crop. As the ground speed increases, so does the throughput, this thus leading, in accordance with the invention, to an automatic enlargement of the sieve opening width and thereby ensures an optimum cleansing action. Should the ground speed become slower, for example, prior to turning the plough, the opening width of the sieve will be correspondingly decreased. This thus prevents a worsening of the cleansing quality as the loading on the cleaning mechanism decreases.

Furthermore, provision is made in another embodiment of the invention, for the setting range of the cleaning mechanism 1 to be predefined on the basis of limiting values. This will then prevent the cleaning mechanism from being adjusted to such an extent that it would reach the end stops of the adjusting member when the combine harvester is freewheeling during the harvesting operation for example.

The invention claimed is:

1. A controlled crop cleaning mechanism for a harvester such as a combine, said mechanism comprising:
   a sieve, said sieve having a plurality of openings, each of said openings being adjustable between a narrower position and a wider position;
   a fan, said fan being disposed to blow air through said openings of said sieve sufficient to separate crop from chaff, said fan being adjustable between a faster and a slower speed;
   a sensor, said sensor sensing a load on said sieve, said sensing being independent of said air blown by said fan;
   a controller, said controller being in operative communication with said sensor to receive a signal corresponding to a load sensed and said controller being in operative communication with an adjustor of said openings, said controller being configured to widen said openings when said sensed load increases and to narrow said openings when said sensed load decreases, said controller being further configured such that said widening and said narrowing is directly responsive to said sensed load and exclusive of any effect of said air blown by said fan;
   wherein said controller is preconfigured to change said position of said openings according to a first function of said sensed load when said fan is at a first speed and to change said position of said openings according to a second function when said fan is at a second speed.

2. The mechanism of claim 1 wherein said functions are stored in a memory.

3. The mechanism of claim 2 wherein said preconfigured functions may be reconfigured by an operator of said harvester.

4. The mechanism of claim 1 wherein said controller also varies the speed of said fan in a preconfigured relationship to said sensed load.

5. The mechanism of claim 1 wherein said widening or said narrowing of said openings is delayed in time from a receipt of a signal indicating a change in said sensed load.

6. The mechanism of claim 1 further comprising a sensor selected from a group sensing parameters consisting of: straw in a feeder house, a moisture content of a cut crop, an amount of crop cut and a ground speed.

7. The mechanism of claim 1 wherein said controller is directly responsive to said sensed load, said sensed load being a combination of signals from a plurality of sensors.

8. The mechanism of claim 1 further comprising a second sieve, said second sieve having a plurality of openings and wherein said controller is configured to adjust said openings in said second sieve between a narrower position and a wider position.

9. A controlled crop cleaning mechanism for a harvester such as a combine, said mechanism comprising:
   a sieve, said sieve having a plurality of openings, each of said openings being adjustable between a narrower position and a wider position;
   a fan, said fan being disposed to blow air through said openings of said sieve sufficient to separate crop from chaff, said fan being adjustable between a faster and a slower speed;
   a sensor, said sensor sensing a load on said, sieve, said sensing being independent of said air blown by said fan;
   a controller, said controller being in operative communication with said sensor to receive a signal corresponding to a load sensed and said controller being in operative communication with an adjustor of said openings, said controller being configured to widen said openings when said sensed load increases and to narrow said openings when said sensed load decreases, said controller being further configured such that said widening and said narrowing is directly responsive to said sensed load and exclusive of any effect of said air blown by said fan;
   a memory, said memory storing a first function correlating a position of said openings to a sensed load when said fan is at a first speed and said memory storing a second function correlating a second position of said openings in response to said sensed load when said fan is at a second speed;
   said controller having an operational condition, said operational condition executing said widening or said narrowing of said openings according to said preconfigured function in said memory and said controller having a configuration state wherein an operator using an operator interface may configure at least one of said functions in said memory;
   said controller being further configurable to delay execution of said widening or said narrowing of said openings for a period of time after a change in said sensed load.

10. The mechanism of claim 9 wherein said widening and said narrowing is exclusively responsive to said sensed load.

11. The mechanism of claim 9 wherein said controller is preconfigured to change said position of said openings according to a first function of said sensed load when said fan is at a first speed and to change said position of said openings according to a second function when said fan is at a second speed.

12. The mechanism of claim 9 wherein said preconfigured functions may be reconfigured by an operator of said harvester.

13. The mechanism of claim 9 wherein said controller also varies the speed of said fan in a preconfigured relationship to said sensed load.

14. The mechanism of claim 9 comprising a sensor selected from a group sensing parameters consisting of: straw in a feeder house, a moisture content of a cut crop, an amount of crop cut and a ground speed.

15. The mechanism of claim 9 wherein said controller is directly responsive to said sensed load, said sensed load being a combination of signals from a plurality of sensors.

16. The mechanism of claim 9 further comprising a second sieve, said second sieve having a plurality of openings and wherein said controller is configured to adjust said openings in said second sieve between a narrower position and a wider position.

* * * * *